United States Patent
Hwang et al.

(10) Patent No.: US 8,749,616 B2
(45) Date of Patent: Jun. 10, 2014

(54) APPARATUS AND METHOD FOR CREATING AND DISPLAYING MEDIA FILE

(75) Inventors: Seo-Young Hwang, Suwon-si (KR); Jae-Yeon Song, Seoul (KR); Gun-Ill Lee, Seoul (KR); Kook-Heui Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 889 days.

(21) Appl. No.: 12/468,471

(22) Filed: May 19, 2009

(65) Prior Publication Data

US 2009/0284583 A1  Nov. 19, 2009

(30) Foreign Application Priority Data

May 19, 2008  (KR) .................. 10-2008-0046315

(51) Int. Cl.
*H04N 13/00* (2006.01)
*G09G 5/00* (2006.01)
*H04N 15/00* (2006.01)

(52) U.S. Cl.
USPC .............................. 348/43; 345/631

(58) Field of Classification Search
CPC ............ H04N 13/0003; H04N 21/236; H04N 13/0007; H04N 13/0048; H04N 19/00054; G03B 35/16; G06T 2200/04; G06T 2207/20228; G06T 2210/32
USPC .......................................................... 348/43
See application file for complete search history.

(56) References Cited

U.S. PATENT DOCUMENTS

| | | | |
|---|---|---|---|
| 6,055,012 A * | 4/2000 | Haskell et al. | 348/48 |
| 6,072,831 A * | 6/2000 | Chen | 375/240.03 |
| 7,184,036 B2 * | 2/2007 | Dimsdale et al. | 345/419 |
| 7,230,986 B2 * | 6/2007 | Wise et al. | 375/240.26 |
| 7,486,311 B2 * | 2/2009 | Baker et al. | 348/219.1 |
| 7,528,830 B2 * | 5/2009 | Redert | 345/420 |
| 7,529,400 B2 * | 5/2009 | Katata et al. | 382/154 |
| 7,561,779 B2 * | 7/2009 | Yahata et al. | 386/239 |
| 7,580,463 B2 * | 8/2009 | Routhier et al. | 375/240.25 |
| 7,580,952 B2 * | 8/2009 | Logan et al. | 1/1 |
| 7,643,025 B2 * | 1/2010 | Lange | 345/419 |
| 7,702,016 B2 * | 4/2010 | Winder et al. | 375/240.12 |

(Continued)

FOREIGN PATENT DOCUMENTS

| EP | 1 501 317 | 1/2005 |
|---|---|---|
| EP | 1 617 684 | 1/2006 |

(Continued)

OTHER PUBLICATIONS

"Coding of Audio-Visual Objects," International Standard WD 3.0 ISO/IEC 14496-1, 2002, pp. 1-487.*

(Continued)

*Primary Examiner* — Melvin H Pollack
(74) *Attorney, Agent, or Firm* — The Farrell Law Firm, P.C.

(57) ABSTRACT

A method and apparatus for creating and displaying a media file. A computer-readable recording medium is disclosed for storing stereoscopic content having two or more tracks and stereoscopic video-related information of each track in the stereoscopic content. The medium includes a duplication indication field indicating duplication of stereoscopic video-related information of each track in the stereoscopic content, and a track reference field including information used to connect a current track to at least one other track to which the current rack refers.

30 Claims, 15 Drawing Sheets

(56) References Cited

U.S. PATENT DOCUMENTS

| | | | |
|---|---|---|---|
| 7,710,463 B2 * | 5/2010 | Foote | 348/218.1 |
| 7,746,931 B2 * | 6/2010 | Kato et al. | 375/240.16 |
| 7,747,765 B2 * | 6/2010 | Jones et al. | 709/230 |
| 7,825,991 B2 * | 11/2010 | Enomoto | 348/588 |
| 7,848,425 B2 * | 12/2010 | Cho et al. | 375/240.16 |
| 7,855,737 B2 * | 12/2010 | Petrescu et al. | 348/239 |
| 7,857,700 B2 * | 12/2010 | Wilder et al. | 463/33 |
| 7,898,578 B2 * | 3/2011 | Nakamura | 348/231.3 |
| 7,908,273 B2 * | 3/2011 | DiMaria et al. | 707/736 |
| 7,970,221 B2 * | 6/2011 | Yang | 382/233 |
| 8,042,094 B2 * | 10/2011 | Napoli et al. | 717/109 |
| 8,044,994 B2 * | 10/2011 | Vetro et al. | 348/42 |
| 8,098,728 B2 * | 1/2012 | Winder et al. | 375/240.12 |
| 8,111,758 B2 * | 2/2012 | Yun et al. | 375/240.28 |
| 2005/0041736 A1 * | 2/2005 | Butler-Smith et al. | 375/240.01 |
| 2005/0244135 A1 * | 11/2005 | Yahata et al. | 386/52 |
| 2005/0259147 A1 * | 11/2005 | Nam et al. | 348/43 |
| 2006/0028479 A1 * | 2/2006 | Chun et al. | 345/531 |
| 2006/0262856 A1 * | 11/2006 | Wu et al. | 375/240.19 |
| 2007/0147502 A1 * | 6/2007 | Nakamura | 375/240.12 |
| 2007/0206926 A1 * | 9/2007 | Ando et al. | 386/95 |
| 2008/0033983 A1 | 2/2008 | Ko | |
| 2008/0098052 A1 | 4/2008 | Kim et al. | |
| 2008/0098083 A1 | 4/2008 | Shergill et al. | |
| 2008/0117231 A1 * | 5/2008 | Kimpe | 345/629 |
| 2008/0151112 A1 * | 6/2008 | Basile et al. | 348/500 |
| 2008/0246836 A1 * | 10/2008 | Lowe et al. | 348/46 |
| 2008/0247670 A1 * | 10/2008 | Tam et al. | 382/298 |
| 2008/0259073 A1 * | 10/2008 | Lowe et al. | 345/419 |
| 2009/0034629 A1 * | 2/2009 | Suh et al. | 375/240.27 |
| 2009/0251531 A1 * | 10/2009 | Marshall et al. | 348/42 |
| 2009/0279608 A1 * | 11/2009 | Jeon et al. | 375/240.16 |
| 2009/0304068 A1 * | 12/2009 | Pandit et al. | 375/240.01 |
| 2010/0020871 A1 * | 1/2010 | Hannuksela et al. | 375/240.12 |
| 2010/0039499 A1 | 2/2010 | Nomura et al. | |
| 2010/0060717 A1 * | 3/2010 | Klein Gunnewiek et al. | 348/43 |
| 2010/0097525 A1 * | 4/2010 | Mino | 348/564 |
| 2010/0146018 A1 * | 6/2010 | Kim | 707/822 |
| 2010/0165077 A1 * | 7/2010 | Yin et al. | 348/42 |
| 2010/0182403 A1 * | 7/2010 | Chun et al. | 348/43 |
| 2010/0231689 A1 * | 9/2010 | Bruls et al. | 348/43 |
| 2010/0271463 A1 * | 10/2010 | Gutierrez Novelo | 348/43 |
| 2010/0289876 A1 * | 11/2010 | Shin et al. | 348/43 |
| 2011/0050990 A1 * | 3/2011 | Farkash | 348/425.4 |
| 2011/0187821 A1 * | 8/2011 | Routhier et al. | 348/43 |

FOREIGN PATENT DOCUMENTS

| | | | |
|---|---|---|---|
| EP | 2247115 A1 * | 11/2010 | |
| KR | 1020050121246 | 12/2005 | |
| KR | 1020080004772 | 1/2008 | |
| WO | WO 2009093881 A1 * | 7/2009 | |

OTHER PUBLICATIONS

"Coding of Moving Pictures and Audio Information, XMT and MPEG-J Extensions," ISO/IEC 14496-11, 2003, pp. 1-38.*

"ISO Base Media File Format," ISO/IEC 14496-12, 2003, pp. 1-24.*

Goodwin, J. and Apel, H. "A Uniform Resource Name (URN) Namespace for the International Organization for Standardization (ISO)," RFC 5141, Mar. 2008, pp. 1-28.*

Puri, A. et al. "Basics of Stereoscopic Video, New Compression Results with MPEG-2 and a Proposal for MPEG-4," Signal Processing: Image Communication, vol. 10, Issues 1-3, MPEG-4, Part 2, Jul. 1997, pp. 201-234.*

Aksay, Anil et al. "End-to-End Stereoscopic Video Streaming with Content-Adaptive Rate and Format Control," Signal Processing: Image Communication, vol. 22, Issue 2, Feb. 2007, pp. 157-168.*

Pehlivan, S. et al. "End-to-End Stereoscopic Video Streaming System," IEEE International Conference on Multimedia and Expo, Jul. 12, 2006, pp. 2169-2172.*

Yang, W. "An MPEG-4-Compatible Stereoscopic/Multiview Video Coding Scheme," IEEE Transactions on Circuits and Systems for Video Technology, vol. 16, Issue 2, Feb. 2006, pp. 286-290.*

Chang, Gan-Cheih. "Multi-View Image Compression and Intermediate View Synthesis for Stereoscopic Applications," The 2000 IEEE International Symposium on Circuits and Systems, vol. 2, 2000, p. 277-280.*

Siegel, Mel et al. "Compression and Interpolation of 3D-Stereoscopic and Multi-View Video," Stereoscopic Displays, 1997, pp. 1-13.*

Hom Yo-Sung. "Overview of Multi-View Coding," 14th International Workshop on Systems, Signals and Image Processing, 2007 and 6th EURASIP Conference Focused on Speech and Image Processing, Multimedia Communications and Services, Jun. 27-30, 2007, pp. 5-12.*

Ohm, Jens-Rainer. "Stereo/Multiview Video Encoding using the MPEG Family of Standards," Society of Photo-Optical Instrumentation Engineers, 1999.*

Lim, Jeong Eun et al. "A Multiview Sequence CODEC with View Scalability," Signal Processing: Image Communication, vol. 19, Issue 3, Mar. 2004, pp. 239-256.*

Next Generation Broadcasting Forum, Korea: "Proposal for Technical Specification of Stereoscopic MAF", ISO/IEC JTC 1/SC 29/WG 11, Jun. 2007.

International Standard, Information Technology—Coding of Audio-Visual Objects—Part 12: ISO Base Media File Format, ISO/IEC 14496-12, Corrected Version, Oct. 1, 2005.

* cited by examiner

APPARATUS AND METHOD FOR CREATING AND DISPLAYING MEDIA FILE

PRIORITY

This application claims priority under 35 U.S.C. §119(a) to a Korean Patent Application filed in the Korean Intellectual Property Office on May 19, 2008 and assigned Serial No. 10-2008-0046315, the contents of which are incorporated herein by reference.

BACKGROUND OF THE INVENTION

1. Field of the Invention

The present invention relates generally to an apparatus and method for creating and replaying media files, and more particularly, to an apparatus and method for creating and displaying stereoscopic media files in a media file playback apparatus.

2. Description of the Related Art

Moving Picture Experts Group (MPEG), which is an international multimedia standards organization, has released MPEG-2, MPEG-4, MPEG-7 and MPEG-21 standards since its first standardization of MPEG-1 in 1988. Multimedia Application Format (MAF), which is under standardization, intends to increase values of known standards by combining existing MPEG standards with non-MPEG standards to meet the industrial needs. The main purpose of the MAF standardization is to provide a standardized file format for a specific application, thereby enabling a wide use of the application and a supply of MPEG standards.

Recently, extensive research on methods for implementing Three-Dimensional (3D) videos has been conducted to represent more realistic video information. One of the methods scans both left and right-view images on the existing display device at their associated locations to separately image the left view and the right view on the left eye and the right eye of the user, using visual characteristics of human beings, thereby allowing the user to experience 3D effects. For example, a portable terminal equipped with a barrier Liquid Crystal Display (LCD) may provide more lifelike videos to the user by replaying stereoscopic contents.

Stereoscopic contents composed of two or more tracks may include, for each track, the same stereoscopic video-related information about, for example, a frame structure of stereoscopic streams, which of the left view sequence and the right view sequence was encoded first, and whether each frame is a stereoscopic or monoscopic video frame. The duplicate stereoscopic video-related information may be stored in only one track. Conventionally, however, a syntax based on which it is possible to determine the duplication of the stereoscopic video-related information, is not defined in a file format. Therefore, there is a need for a method and apparatus capable of providing information based on which duplication of stereoscopic video-related information can be determined, when each track of stereoscopic contents consisting of two or more tracks has the same stereoscopic video-related information.

SUMMARY OF THE INVENTION

An aspect of the present invention is to address at least the above-mentioned problems and/or disadvantages and to provide at least the advantages described below. Accordingly, an aspect of the present invention provides an apparatus and method for providing information based on which duplication of stereoscopic video-related information can be determined, when each track of stereoscopic contents composed of two or more tracks includes the same stereoscopic video-related information.

According to the present invention, there is provided a computer-readable recording medium for storing stereoscopic content having two or more tracks and stereoscopic video-related information of each track in the stereoscopic content, including a duplication indication field indicating duplication of stereoscopic video-related information of each track in the stereoscopic content, and a track reference field including information used to connect a current track to at least one other track referred to by the current track.

According to the present invention, there is provided a computer-implemented method in a terminal, including receiving a media file, parsing a duplication indication field indicating duplication of stereoscopic video-related information of each track in stereoscopic content having two or more tracks, parsing a track reference field including information used to connect a current track to at least one other track that the current rack refers to, and displaying the received media file based on the parsing.

According to the present invention, there is provided a terminal apparatus for receiving a media file, including a unit for receiving and storing a media file, a processor for parsing a duplication indication field indicating duplication of stereoscopic video-related information of each track in stereoscopic content having two or more tracks, and parsing a track reference field including information used to connect a current track to at least one other track that the current rack refers to, and a display unit for displaying the received media file based on the parsing.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE PREFERRED EMBODIMENTS

Figure 1:
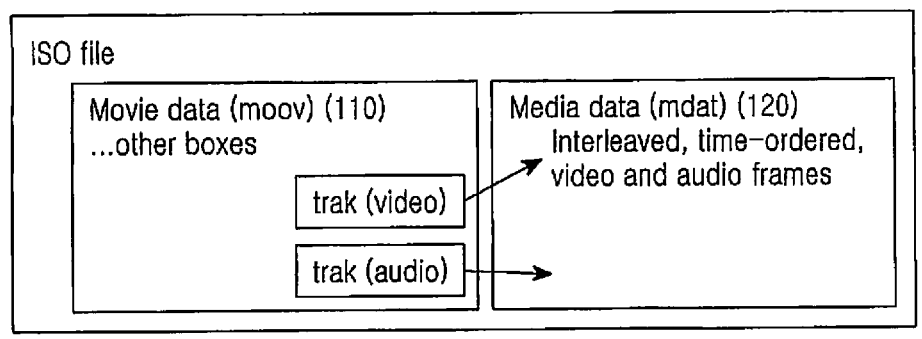
FIG. 1 illustrates a media file format based on the International Organization for Standardization (ISO)/International Electrotechnical Commission (IEC) 14496-12 standard.

Throughout the drawings, the same drawing reference numerals will be understood to refer to the same elements, features and structures.

Hereinafter, preferred embodiments of the present invention will be described with reference to the accompanying drawings. In the following description and drawings, a detailed description of known functions and configurations incorporated herein will be omitted for the sake of clarity and conciseness.

The terms and words used in the following description and claims are not limited to their dictionary meanings, and are merely used by the inventor to enable a clear and consistent understanding of the invention. Accordingly, it should be apparent to those skilled in the art that the following description of preferred embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention provides a method and apparatus for creating a file format capable of indicating that each track uses the same stereoscopic video-related information, when stereoscopic video-related information of each track is the same regarding stereoscopic contents composed of two or more tracks.

Before a description of a stereoscopic content storage format is given, a block structure of a media file format based on the conventional ISO/IEC 14496-12 standard will be described with reference to FIG. 1.

Although not illustrated in FIG. 1, file type ('ftyp') contains details of a file type and a compatibility type. Normal playback is possible in a decoder according to the compatibility type.

The data in a movie box ('moov') 110 is created in an object-based structure, and includes content information such as a frame rate, a bit rate and an image size, sync information for supporting a playback function such as Fast Forward (FF)/REWind (REW), and all other information for replaying the file. In particular, as the 'moov' 110 includes information such as the total number of frames of video and audio data and a size of each frame, the video and audio data can be decoded and replayed by parsing the 'moov' 110 during playback.

Meanwhile, media data ('mdat') 120 includes actual stream data according to each track, and video data and audio data are stored in units of their frames.

Figure 2:
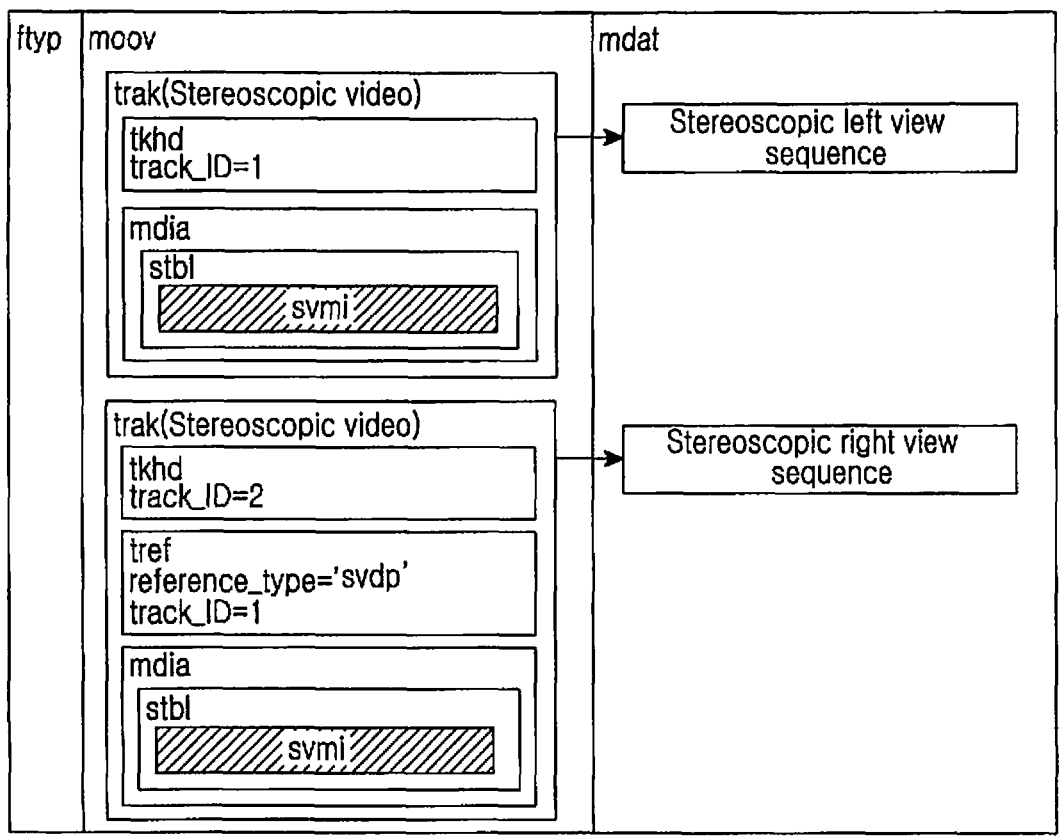
FIG. 2 illustrates a file format of stereoscopic contents.

FIG. 2 illustrates a file format of stereoscopic contents.

FIG. 2, which is defined by modifying the storage format of FIG. 1, illustrates a storage format for a stereoscopic media file composed of two video streams (i.e. a left view sequence and a right view sequence are stored in their associated video streams). For the stereoscopic contents composed of two or more tracks, a track reference box ('tref' box) is used as shown in FIG. 2 to indicate that the tracks are relevant to each other, and to connect the current track to another track to which the current track refers using reference_type and track_ID.

By checking reference_type in the 'tref' box, it is possible to know that the track to be referred to contains additional view media information, i.e. a stereoscopic video stream paired with the track. Referring to FIG. 2, track_ID=1 includes information on a stereoscopic left view stream, and track_ID=2 includes information on a stereoscopic right view stream. By referring to a 'tref' box with track_ID=2, it is possible to recognize that track_ID=1 and track_ID=2 are paired tracks. A stereoscopic video media information box ('svmi' box) containing stereoscopic video-related information is included in a sample table box ('stbl' box) containing information on samples (indicating basic units, or frames, that distinguish images in a file format) of a media file in a track ('trak') area.

Table 1 shows an example of a conventional 'svmi' box with stereoscopic video-related information about, for example, a frame structure of stereoscopic streams, which of the left view sequence and the right view sequence was encoded first, and whether each frame is a stereoscopic video frame or a monoscopic video frame.

TABLE 1

Container: Sample Table Box ('stbl')
Mandatory: Yes
Quantity: Exactly one
aligned(8) class StereoscopicVideoMediaInformationBox extends
FullBox('svmi', version = 0, 0){
 // stereoscopic visual type information
 unsigned int(8) stereoscopic_composition_type;
 unsigned int(1) is_left_first;
 unsigned int(7) reserved;
 // stereo_mono_change information
 unsigned int(32) stereo_mono_change_count;
 for(i=0; i<stereo_mono_change_count; i++){
  unsigned int(32) sample_count;
  unsigned int(1)  stereo_flag;
  unsigned int(7)  reserved;
 }
}
[Semantics]
stereoscopic_composition_type: frame structure of stereoscopic video contents
is_left_first: it indicates which of the left view sequence and the right view sequence is encoded first.
stereo_mono_change_count: the number of fragments composed of samples having consecutive values
sample_count: the number of samples having consecutive values
stereo_flag: it indicates whether the current frame is a stereoscopic frame or a monoscopic frame.

The present invention implements a storage format including stereoscopic content-related information by modifying the storage format of FIG. 2, and implements a system for a creation and playback apparatus using the same. The storage format disclosed in the present invention includes information based on which duplication of stereoscopic video-related information can be determined. The present invention removes redundancy of the information using the information based on which duplication of stereoscopic video-related information in the storage format can be determined.

Figure 3A:
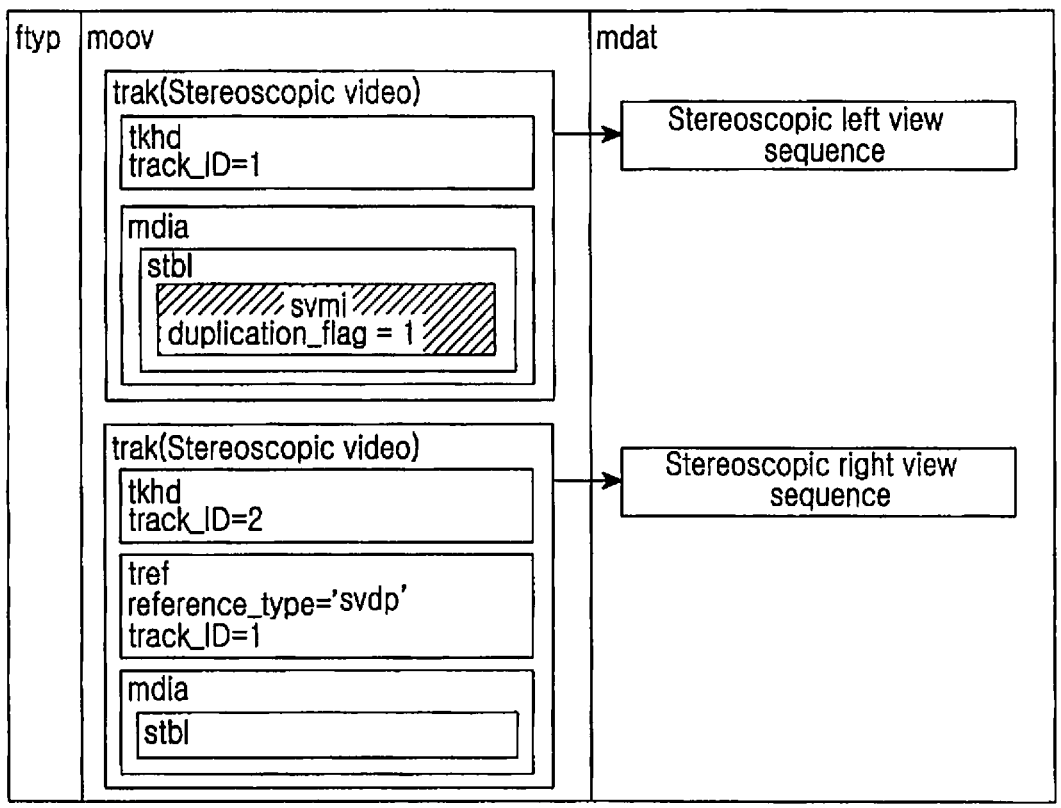
FIGS. 3A and 3B illustrate stereoscopic content storage formats according to a first embodiment of the present invention.
Figure 3B:
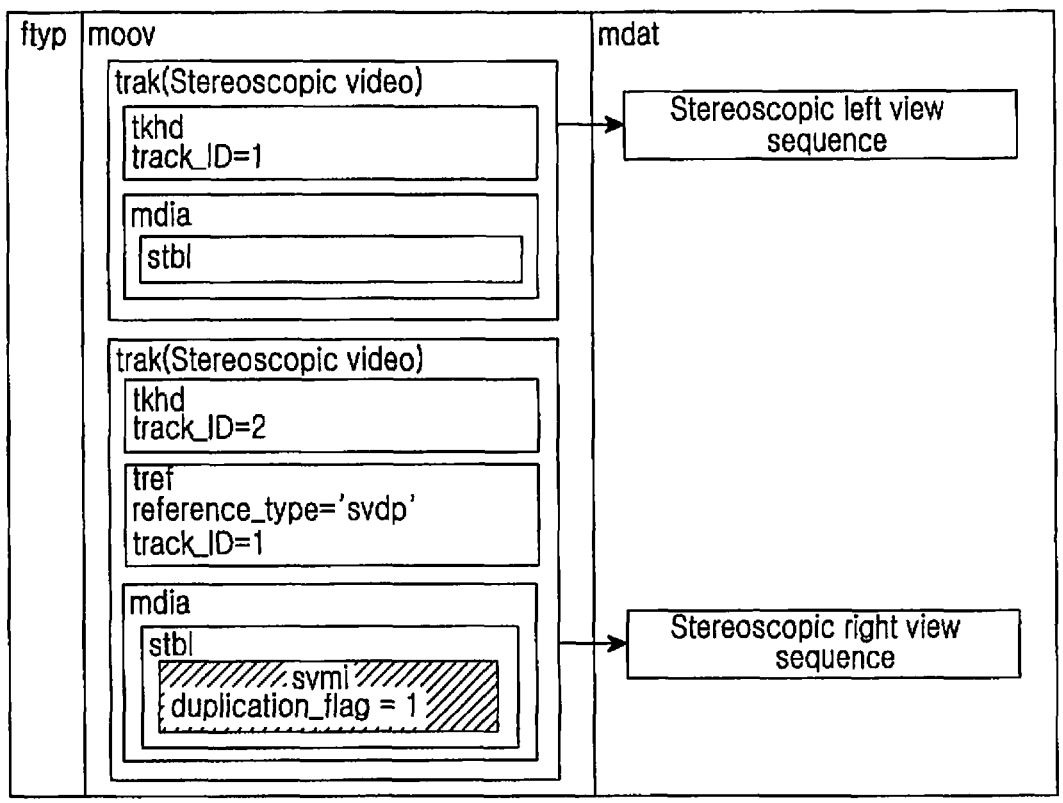

FIGS. 3A and 3B illustrate stereoscopic content storage formats according to a first embodiment of the present invention.

Referring to FIGS. 3A and 3B, information, i.e., 'duplication_flag', based on which duplication of stereoscopic video-related information can be determined is added in a 'svmi' box, which includes stereoscopic video-related information. When stereoscopic video-related information of two tracks, i.e. information included in a 'svmi' box, is the same in stereoscopic contents composed of two or more tracks, the use of 'duplication_flag' omits the information in any one of the two tracks. For example, a 'svmi' box in a track with track_ID=2 is omitted in FIG. 3A, whereas a 'svmi' box in a track with track_ID=1 is omitted in FIG. 3B.

Table 2 is defined by adding information based on which duplication of stereoscopic video-related information is determined as described in FIGS. 3A and 3B. In other words, Table 2 is defined by adding 'duplication_flag' in a 'svmi' box, which includes stereoscopic video-related information. The 'duplication_flag' is set to '1' (true), when details of the 'svmi' box with stereoscopic video-related information are the same among two or more paired stereoscopic video streams.

TABLE 2

Container: Sample Table Box ('stbl')
Mandatory: Yes
Quantity: Exactly one
aligned(8) class StereoscopicVideoMediaInformationBox extends
FullBox('svmi', version = 0, 0){
// stereoscopic visual type information
unsigned int(8) stereoscopic_composition_type;
unsigned int(1) is_left_first;
unsigned int(1) duplication_flag;
unsigned int(6) reserved;
// stereo_mono_change information
unsigned int(32) stereo_mono_change_count;
for(i=0; i<stereo_mono_change_count; i++){
    unsigned int(32) sample_count;
    unsigned int(1)  stereo_flag;
    unsigned int(7)  reserved,
}
}
[Semantics]
duplication_flag: it indicates whether stereoscopic video-related
information contained in each 'svmi'
Box of associated stereoscopic contents is the same. (0: duplication
false, 1:duplication true)

Figure 4:
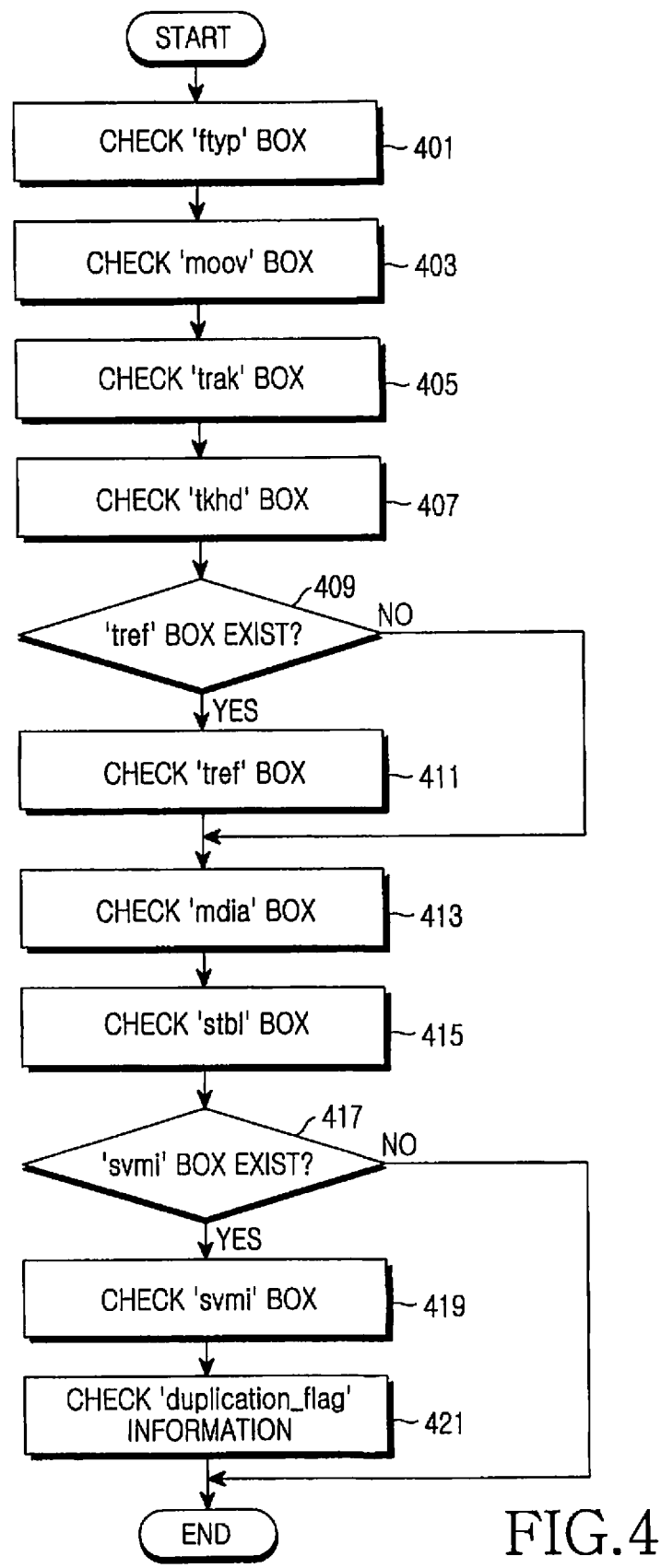
FIG. 4 illustrates a terminal operation of parsing a media file according to the first embodiment of the present invention.

FIG. 4 illustrates a terminal operation of parsing a media file according to the first embodiment of the present invention.

Referring to FIG. 4, a terminal checks an 'ftyp' box in a media file in step 401. The 'ftyp' box is generally provided by the conventional ISO/IEC 14496-12 standard. Further, the terminal checks a 'moov' box in step 403, and checks a 'trak' box in step 405. The sub-process of checking the 'trak' box is repeatedly implemented on the first track to the last track of the media file. In step 407, the terminal checks a track header box ('tkhd' box) to identify a track_ID. In step 409, the terminal determines whether the track includes a 'tref' box. If the track includes a 'tref' box, the terminal checks the 'tref' box in step 411. By checking information of the 'tref' box, it is possible to determine a stereoscopic video stream paired with the track. Thereafter, the terminal checks a media box ('mdia' box) in step 413.

When the track does not include a 'tref' box in step 409, the terminal directly proceeds to step 413 where it checks an 'mdia' box of the track, and then checks a sample table box ('stbl' box) in step 415. Thereafter, the terminal determines in step 417 whether a 'svmi' box with stereoscopic video-related information exists. If the 'svmi' box exists, the terminal checks the 'svmi' box in step 419, and checks 'duplication_flag' in the 'svmi' box in step 421. Based on a value of the 'duplication_flag', the terminal determines whether two paired tracks have the same stereoscopic video-related information. That is, 'duplication_flag' is set to '1' (true) when details of the 'svmi' box are the same.

In operation of all preferred embodiments of the present invention, the expression "checking a box" is equivalent to a process of parsing a file to decode data on each track, and indicates parsing information (fields and parameters) contained in the box.

Although a process of checking the respective boxes is needed in all operations of the terminal, the sequence in which the respective boxes are checked does not have to follow the sequence in the drawing. The parsing process for the file format and the terminal's operation, which are not described in detail herein, will conform to the ISO/IEC 14496-12 standard.

Figure 5A:
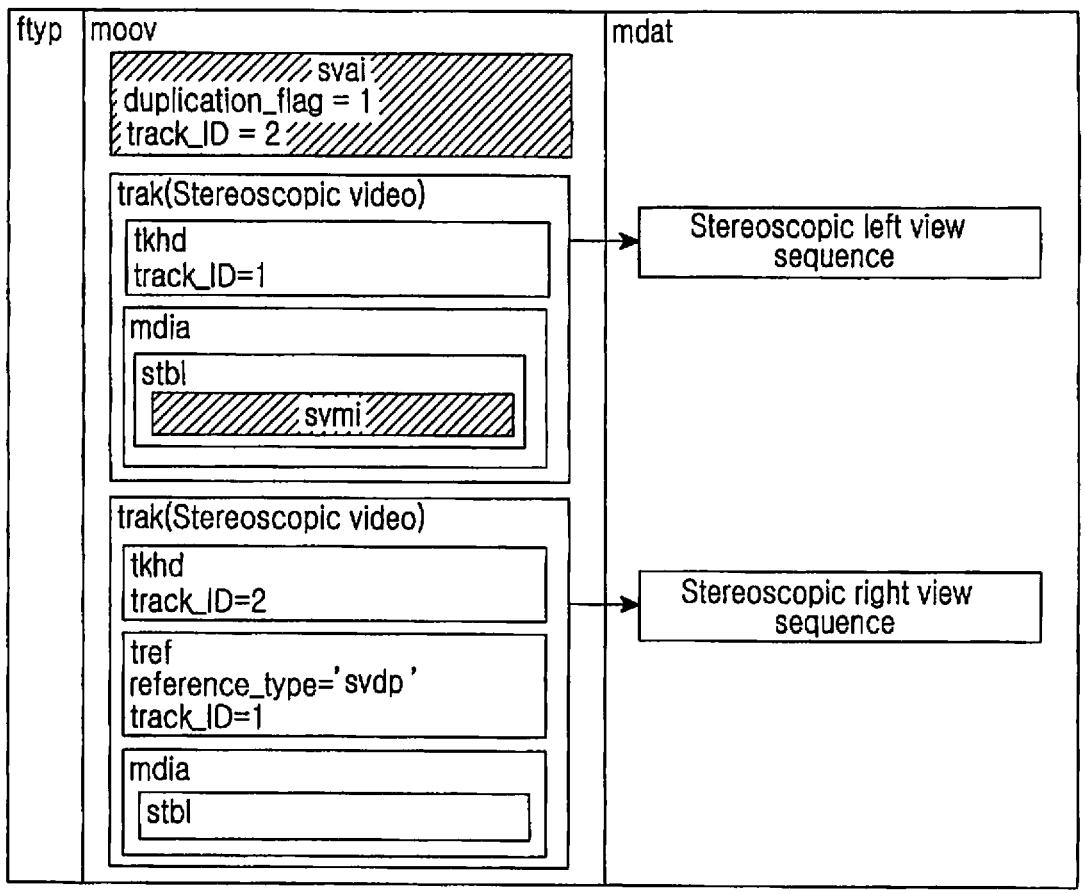
FIGS. 5A and 5B illustrate stereoscopic content storage formats according to a second embodiment of the present invention.
Figure 5B:
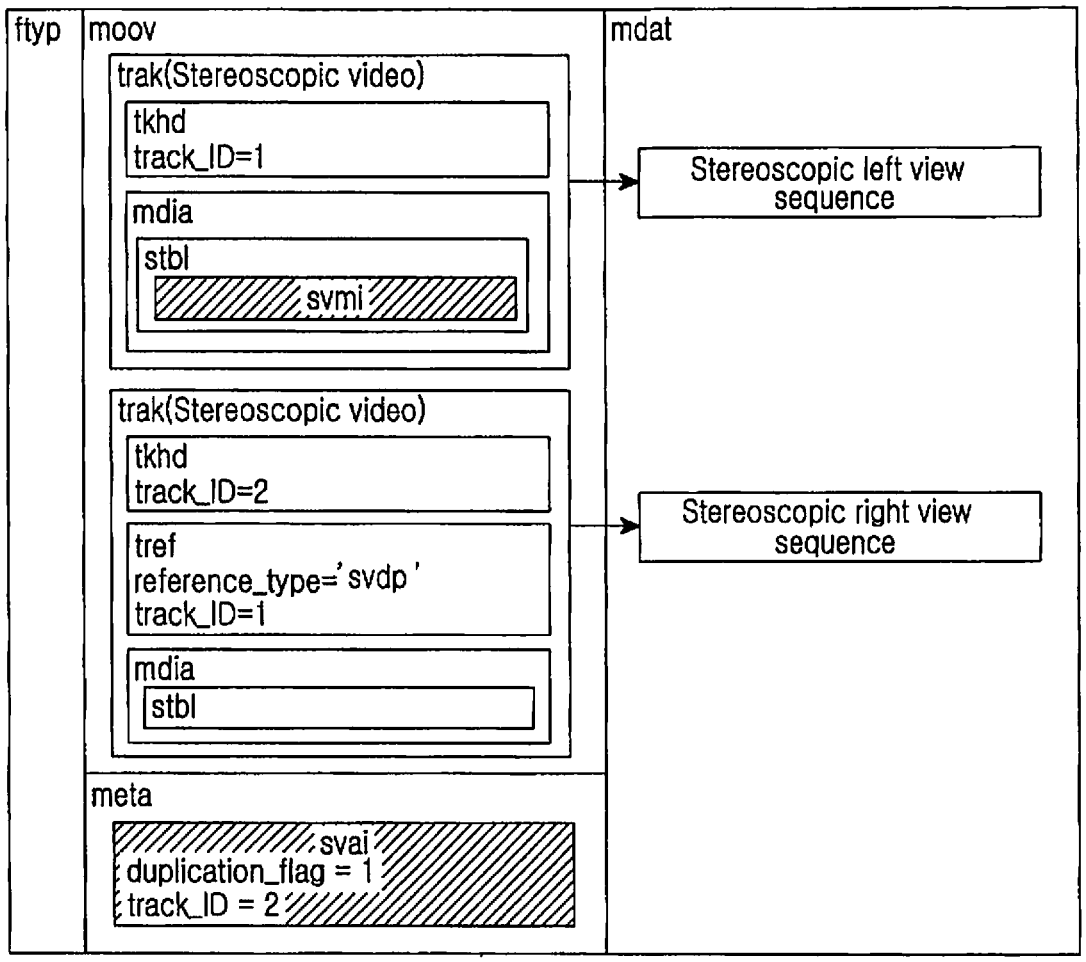

FIGS. 5A and 5B illustrates stereoscopic content storage formats according to a second embodiment of the present invention.

A new stereoscopic video additional information ('svai') box that provides information based on which duplication of stereoscopic video-related information of stereoscopic contents composed of two or more tracks will be described with reference to FIGS. 5A and 5B.

The 'svai' box includes information, i.e. 'duplication_flag', based on which duplication of stereoscopic video-related information is determined, and includes 'track_IDs' indicating tracks with a 'svmi' box omitted, when details of the 'svmi' box with stereoscopic video-related information are the same among stereoscopic video streams, i.e. when 'duplication_flag==1'. For example, if two paired tracks are equal in stereoscopic video-related information of track_ID=1 and track_ID=2, i.e. information contained in their 'svmi' boxes, and a 'svmi' box of the track with track_ID=2 is omitted, then 'duplication_flag' is set to '1' (true), and track_ID=2 of the track with a 'svmi' box omitted is stored.

The 'svai' box is defined as a box at a 'moov' level included in a 'moov' box as shown in FIG. 5A, or as a 'meta' box at a 'moov' level as shown in FIG. 5B.

Table 3A, as described in FIGS. 5A and 5B, gives a definition of a new 'svai' box that includes information, i.e. 'duplication_flag', based on which duplication of stereoscopic video-related information are determined, and also includes 'track_IDs' indicating tracks including a 'svmi' box with stereoscopic video-related information in stereoscopic video streams.

TABLE 3A

Container: movie Box('moov')or meta Boa('meta')
Mandatory: YES
Quantity: Exactly one
aligned(8) class StereoscopicVideoAdditionalInformationBox extends
FullBox('svai', version = 0, 0){
unsigned int(1) duplication_flag;
unsigned int(7) reserved;
if(duplication_flag){
        unsigned int(32) track_IDs[ ];
    }
}
[Semantics]
duplication_flag: it indicates whether stereoscopic video-related
information contained in each 'svmi'
Box of associated stereoscopic contents is the same. (0: duplication
false, 1:duplication true)
track_IDs: it indicates tracks with a 'svmi' Box omitted in
stereoscopic video streams.

Figure 5C:
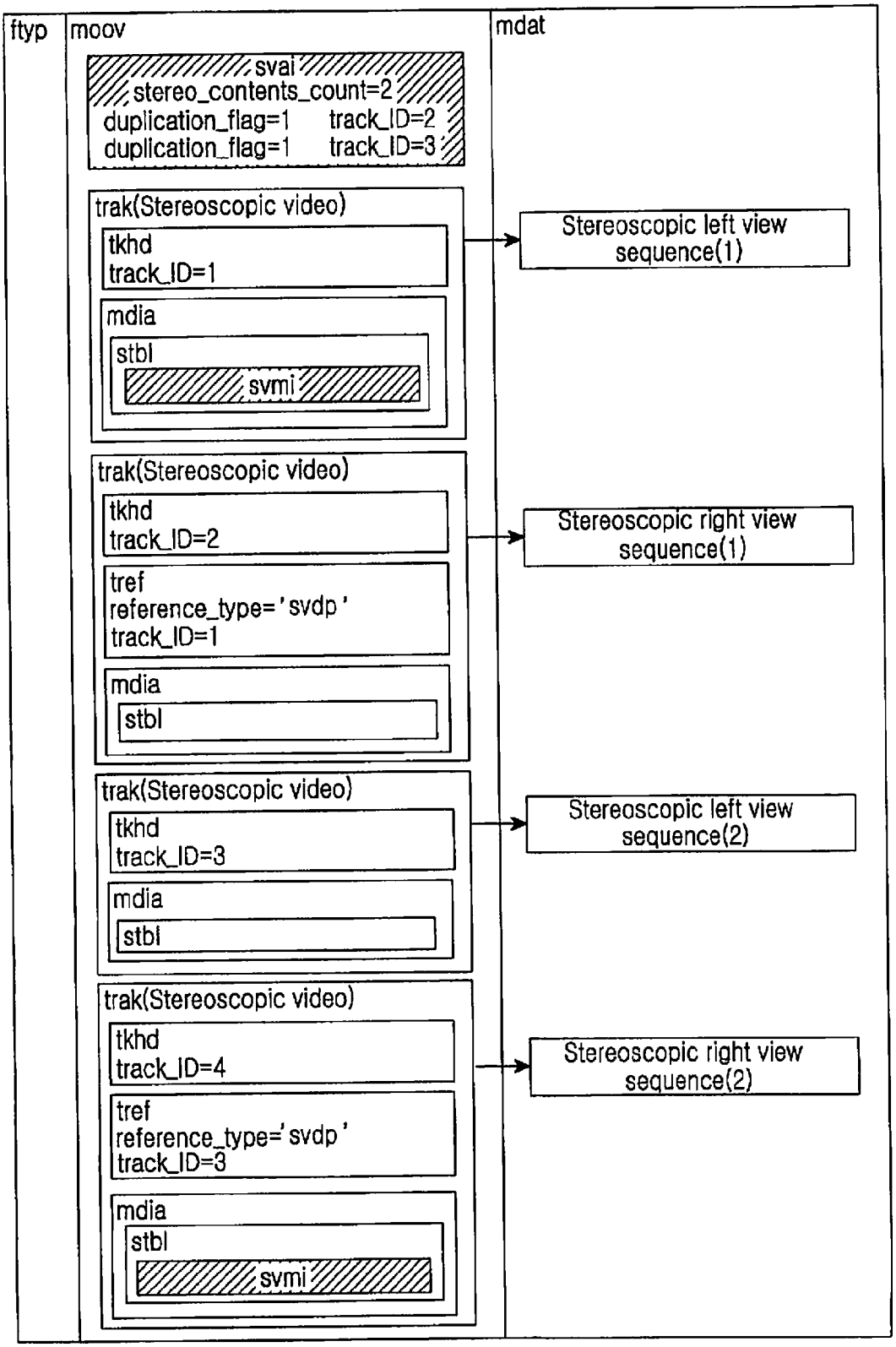
FIG. 5C illustrates a stereoscopic content storage format according to a third embodiment of the present invention.

FIG. 5C illustrates a stereoscopic content storage format according to a third embodiment of the present invention.

Referring to FIG. 5C, a stereoscopic media file is composed of two stereoscopic contents: one video paired with track_ID=1 and track_ID=2 and another video paired with track_ID=3 and track_ID=4. Here, a 'svai' box includes 'stereo_contents_count' information indicating the number of pairs of stereoscopic contents, duplication information 'duplication_flag' for stereoscopic view sequences associated with each content, and information on a stereoscopic track with a 'svmi' box omitted in each pair.

In FIG. 5C, since the stereoscopic media file is composed of two pairs of stereoscopic contents, stereo_contents_count=2, duplication information for a video paired with track_ID=1 and track_ID=2 is set as duplication_flag=1, a stereoscopic track with a 'svmi' box omitted has track_ID=2, duplication information for a video paired with track_ID=3 and track_ID=4 is set as duplication_flag=1, and a stereoscopic track with a 'svmi' box omitted has track_ID=3. Although two paired stereoscopic contents are shown in FIG. 5C, at least one pair could be included in the stereoscopic media file.

Table 3B gives a definition of the new 'svai' box in FIG. 5C according to the present invention.

TABLE 3B

Container: movie Box('moov')or meta Boa('meta')
Mandatory: YES
Quantity: Exactly one
aligned(8) class StereoscopicVideoAdditionalInformationBox extends
    FullBox('svai', version = 0, 0){
    unsigned int(32) stereo_contents_count;
    for(i=0 i<stereo_contents_count; i++){
        unsigned int(1) duplication_flag;
        if(duplication_flag){
            unsigned int(32) track_IDs[ ];
        }
    }
}
[Semantics]
stereo_contents_count: the number of pairs of stereoscopic contents
duplication_flag: it indicates whether stereoscopic video-related information contained in each 'svmi'
Box of associated stereoscopic contents is the same. (0: duplication false, 1:duplication true)
track_IDs: it indicates tracks with a 'svmi' Box omitted in stereoscopic video streams.

Figure 5D:
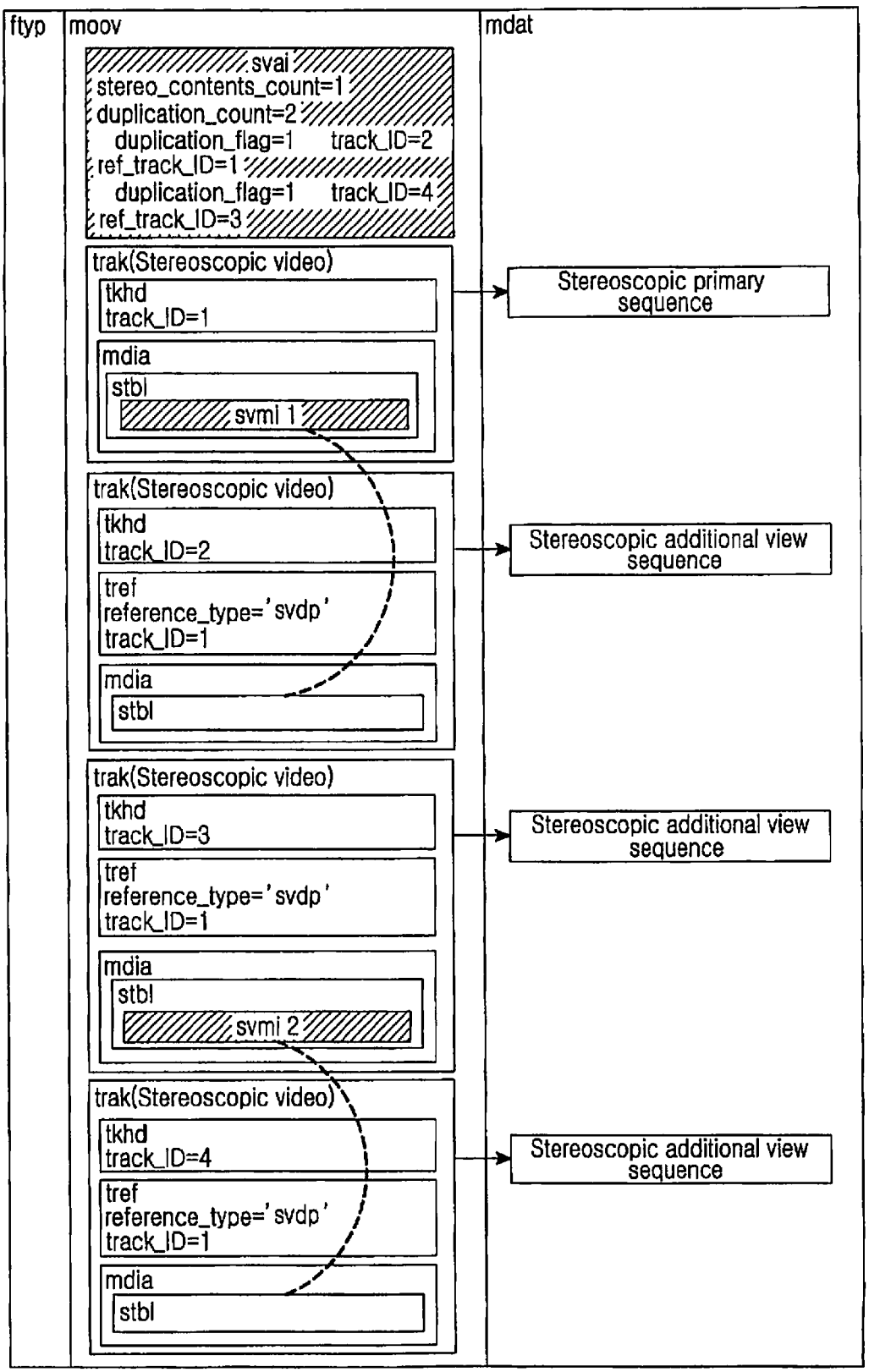
FIG. 5D illustrates a stereoscopic content storage format according to a fourth embodiment of the present invention.

FIG. 5D illustrates a stereoscopic content storage format according to a fourth embodiment of the present invention.

In the exemplary case of FIG. 5D, a, each of which is composed of multiple view sequences, or multiple video tracks. Referring to FIG. 5D, although the stereoscopic media file could be composed of two or more stereoscopic contents, a stereoscopic media file is composed of four stereoscopic view sequences: one primary sequence and three secondary (or sub) sequences. That is, the stereoscopic media file is composed of one video paired with track_ID=1, track_ID=2, track_ID=3 and track_ID=4. Here, a 'svai' box includes 'stereo_contents_count' information indicating the number of pairs of stereoscopic contents, duplication_count information indicating the number of duplicated 'svmi' boxes, 'duplication_flag' information for stereoscopic view sequences associated with each content, and information on a stereoscopic track(s) with a 'svmi' box omitted in each pair.

In FIG. 5D, since the stereoscopic media file is composed of one stereoscopic content pair, stereo_contents_count=1. Further, duplication_count=2 since 'svmi' information for track_ID=1 and track_ID=2 are the same and 'svmi' information for track_ID=3 and track_ID=4 are also the same in the one stereoscopic content pair, and ref_track_ID=1 since a track having the same 'svmi' box information as track_ID=2 with a 'svmi' box omitted is track_ID=1. Similarly, ref_track_ID=3 since a track having the same 'svmi' box information as track_ID=3 with a 'svmi' box omitted is track_ID=4.

Table 3C gives a definition of the new 'svai' box in FIG. 5D according to the present invention.

TABLE 3C

Container: movie Box('moov')or meta Boa('meta')
Mandatory: YES
Quantity: Exactly one
aligned(8) class StereoscopicVideoAdditionalInformationBox extends
FullBox('svai', version = 0, 0){
unsigned int(32) stereo_contents_count;
for(i=0; i<stereo_contents_count; i++){
    unsigned int(32) duplication_count;
        for(i=0; i<stereo_duplication_count; i++){
            unsigned int(1) duplication_flag;
        if(duplication_flag){
            unsigned int(32) track_IDs[ ];
            unsigned int(32) ref_track_IDs[ ];
        }
    }
}
}
[Semantics]
stereo_contents_count: the number of pairs of stereoscopic contents
duplication_count: the number of duplicated 'svmi' Boxes
duplication_flag: it indicates whether stereoscopic video-related information contained in each 'svmi'
Box of associated stereoscopic contents is the same. (0: duplication false, 1:duplication true)
track_IDs: it indicates tracks with a 'svmi' Box omitted in stereoscopic video streams.
ref_track_IDs: it indicates a track having the same 'svmi' Box information as a track with a 'svmi' Box omitted in stereoscopic video streams.

Tables 4A and 4B show new boxes that are added in the present invention based on an ISO based media file format according to the second, third and fourth embodiments of the present invention.

TABLE 4A

| | | | | |
|---|---|---|---|---|
| Ftyp | | | | file type and compatibility |
| moov | | | | container for all the metadata of timed resources |
| | mvhd | | | movie header, overall declarations |
| | | | | Include timescale value for edts or stbl box |
| | trak | | | container for an individual track or stream |
| | | | | indicate Main AV data or auxiliary data |
| | | tkhd | | track header, overall information about the track |
| | | | | contain image size for data or volume for data |
| | | tref | | track reference |
| | | | | "svdp" for Left/Right view sequence type |
| | | mdia | | container for the media information in a track |
| | | | mdhd | media header, overall information about the media |
| | | | hdlr | Handler, declares the media (handler) type |
| | | | | "soun" for audio data |
| | | | | "vide" for visual data |
| | | | | (optional - already declared in iinf box) |

TABLE 4A-continued

| | | | | | |
|---|---|---|---|---|---|
| | | minf | | | media information container |
| | | | stbl | | sample table box, container for the time/space map |
| | | | | | contain time/space map for the samples of timed media (need only for timed text data) |
| | | | | svmi | stereoscopic video media information |
| | svai | | | | Stereoscopic Video Additional Information |
| mdat | | | | | media data container |
| | | | | | Main AV and auxiliary data |
| meta | | | | | Metadata |
| | hdlr | | | | Handler, declares the metadata (handler) type "mp7" |

TABLE 4B

| | | | | | |
|---|---|---|---|---|---|
| ftyp | | | | | file type and compatibility |
| moov | | | | | container for all the metadata of timed resources |
| | mvhd | | | | movie header, overall declarations |
| | | | | | Include timescale value for edts or stbl box |
| | trak | | | | container for an individual track or stream |
| | | | | | indicate Main AV data or auxiliary data |
| | | tkhd | | | track header, overall information about the track |
| | | | | | contain image size for data or volume for data |
| | | tref | | | track reference |
| | | | | | "svdp" for Left/Right view sequence type |
| | | mdia | | | container for the media information in a track |
| | | | mdhd | | media header, overall information about the media |
| | | | hdlr | | Handler, declares the media (handler) type |
| | | | | | "soun" for audio data |
| | | | | | "vide" for visual data |
| | | | | | (optional - already declared in iinf box) |
| | | | minf | | media information container |
| | | | | stbl | sample table box, container for the time/space map |
| | | | | | contain time/space map for the samples of timed media (need only for timed text data) |
| | | | | svmi | stereoscopic video media information |
| mdat | | | | | media data container |
| | | | | | Main AV and auxiliary data |
| meta | | | | | Metadata |
| | hdlr | | | | Handler, declares the metadata (handler) type "mp7" |
| | svai | | | | Stereoscopic Video Additional Information |

Figure 6:
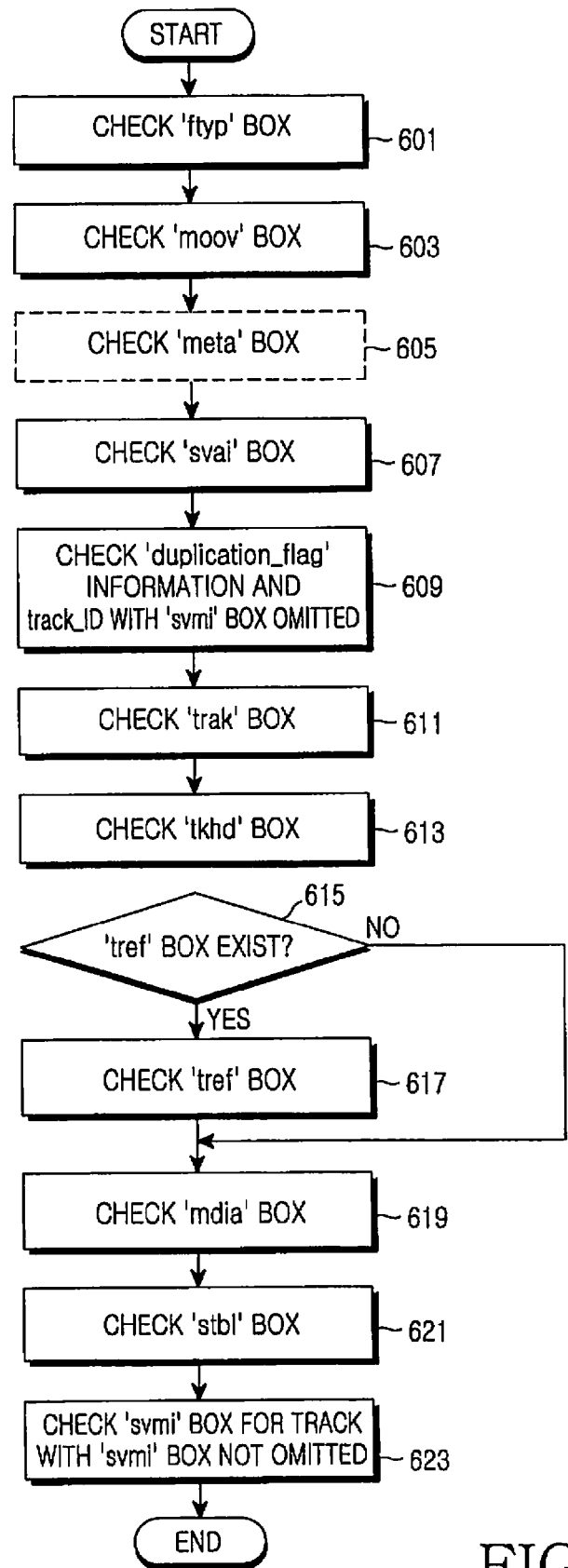
FIG. 6 illustrates a terminal operation of parsing a media file according to the second embodiment of the present invention.

FIG. 6 illustrates a terminal operation of parsing a media file according to the second embodiment of the present invention.

Referring to FIG. 6, a terminal checks an 'ftyp' box in a media file in step 601, and checks a 'moov' box in step 603. As regards, The container for the 'svai' box checked in step 607 may be a box at the same level as a 'trak' level in a 'moov' box as defined in Table 4A, or may be a 'meta' box as defined in Table 4B. When a container of the 'svai' box is a 'moov' box, the terminal checks a 'svai' box after checking the 'moov' box in step 607. When the container of the 'svai' box is a 'meta' box, the terminal checks the 'meta' box to check the 'svai' box in step 605. Here, the 'svai' box, and the 'meta' box at the 'moov' level, which includes the 'svai' box, is checked after the check of a 'trak' box.

In step 609, the terminal determines whether stereoscopic video-related information of two paired tracks is the same, based on a 'duplication_flag' value in the 'svai' box, and detects a track with a 'svmi' box omitted, by identifying the track_ID. That is, in step 609, the terminal checks 'duplication_flag' and track_ID with a 'svmi' box omitted. In step 611, the terminal checks the 'trak' box. The sub-process of checking the 'trak' box is repeatedly implemented on the first track to the last track of the media file. In step 613, the terminal checks a track header box ('tkhd' box) to identify a track_ID. In step 615, the terminal determines whether the track includes a 'tref' box. If the track includes a 'tref' box, the terminal checks the 'tref' box in step 617. Thereafter, the terminal checks an 'mdia' box in step 619.

However, when the track does not include the 'tref' box in step 615, the terminal bypasses step 617 and directly proceeds to step 619 where it checks an 'mdia' box of the track, and then checks a 'stbl' box in step 621. Thereafter, in step 623, the terminal checks the 'svmi', if it is determined, based on the information checked in the 'svai' box, that the track is not a track with a 'svmi' box omitted.

Although a process of checking the respective boxes is needed in all operations of the terminal, the sequence in which the respective boxes are checked does not have to follow the sequence in the drawing. The parsing process for the file format and the terminal's operation, which are not described in detail herein, will conform to the ISO/IEC 14496-12 standard.

Figure 7A:
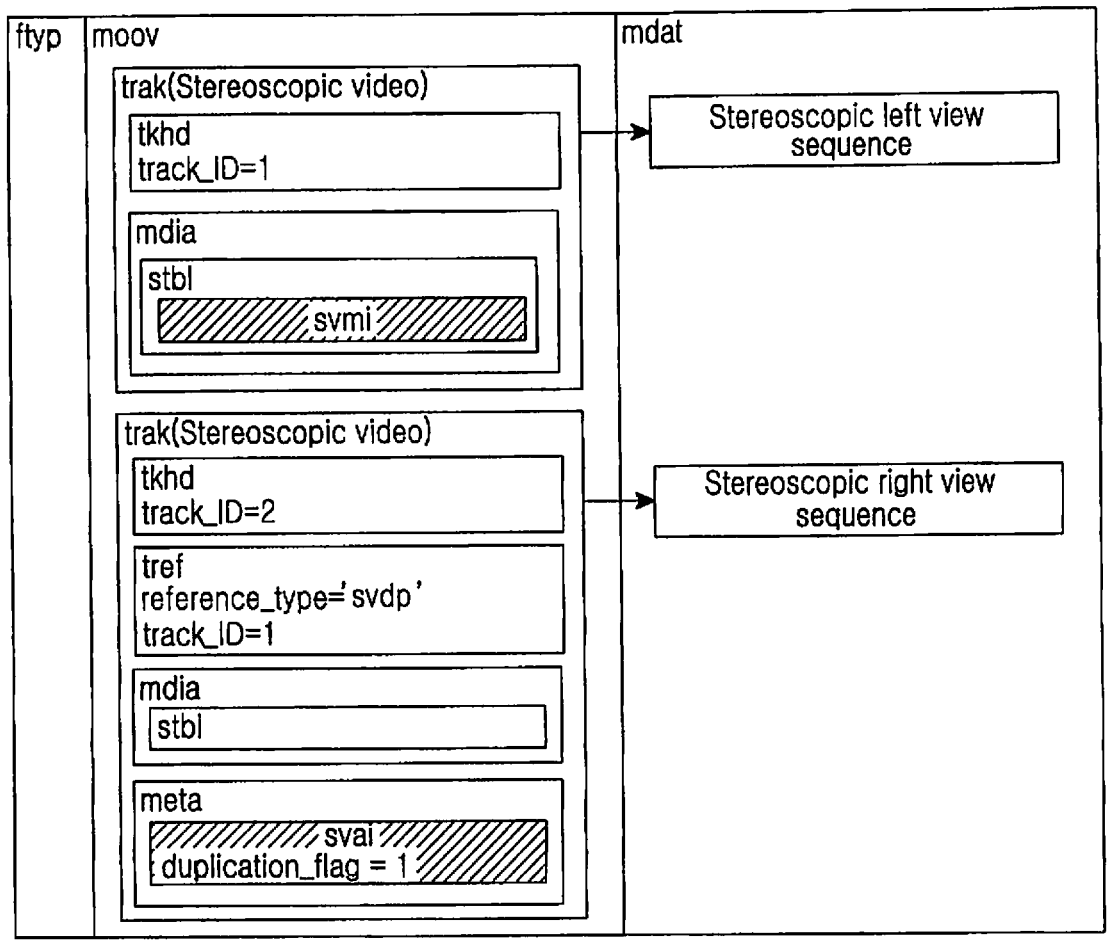
FIGS. 7A and 7B illustrate stereoscopic content storage formats according to a fifth embodiment of the present invention.
Figure 7B:
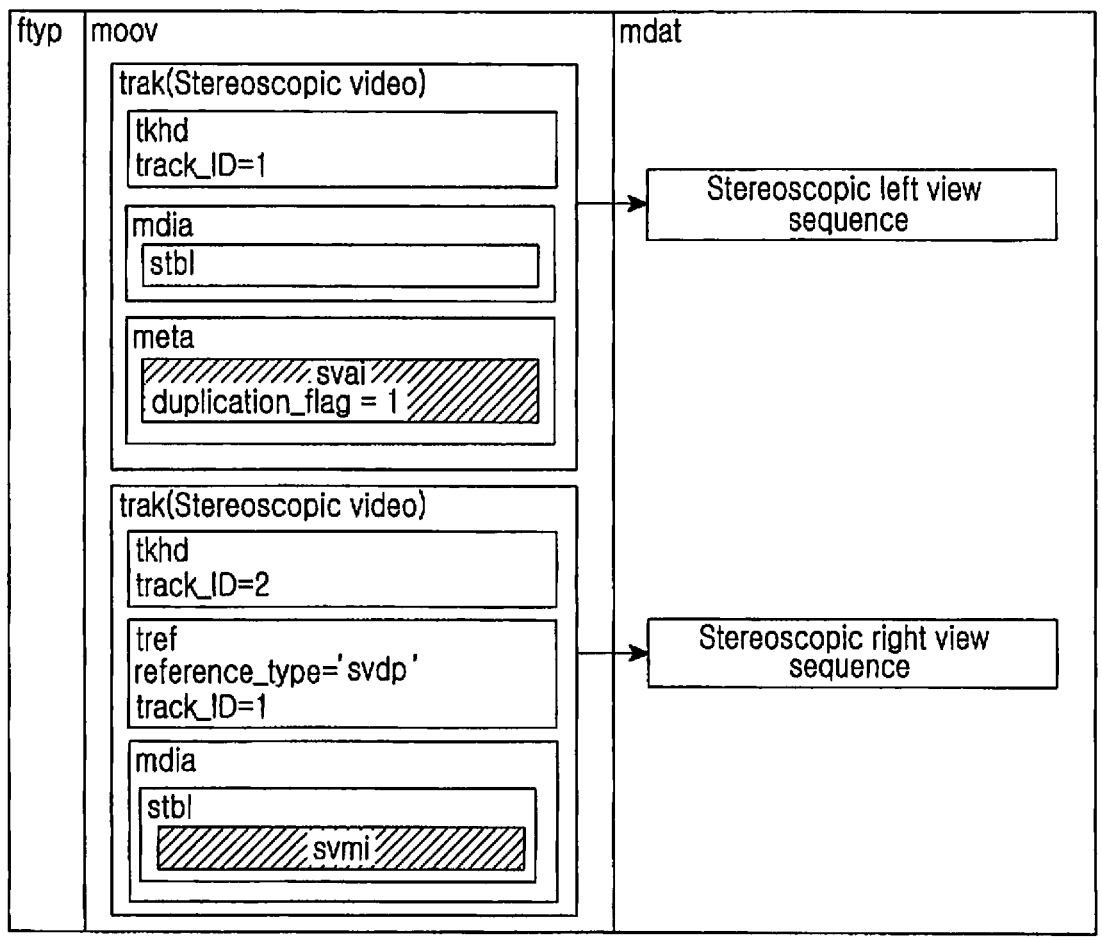

FIGS. 7A and 7B illustrate stereoscopic content storage formats according to a fifth embodiment of the present invention.

Referring to FIGS. 7A and 7B, when stereoscopic video-related information in two tracks, i.e. information contained in the 'svmi' box, is the same in stereoscopic contents consisting of two or more tracks, a new 'svai' box that includes 'duplication_flag' information based on which duplication of stereoscopic video-related information can be determined, is added in a track with a 'svmi' being omitted, in order to omit the information in any one of the two tracks.

In FIG. 7A, a 'svmi' box of a track with track_ID=2 out of two paired tracks with track_ID=1 and track_ID=2 is omitted, and a 'svai' box is added in the track with track_ID=2, the 'svai' box indicating that as 'svmi' box information of the two paired tracks is the same, the information is omitted.

In FIG. 7B, a 'svmi' box of a track with track_ID=1 out of two paired tracks with track_ID=1 and track_ID=2 is omitted, and a 'svai' box is added in a track with track_ID=1, the 'svai' box indicating that as 'svmi' box information of the two paired tracks is the same, the information is omitted.

Table 5 gives a definition of a new 'svai' box that includes 'duplication_flag' information based on which duplication of stereoscopic video-related information is determined, as described in FIGS. 7A and 7B.

TABLE 5

Container: meta Box('meta')
Mandatory: YES
Quantity: Exactly one
aligned(8) class StereoscopicVideoAdditionalInformationBox extends
   FullBox('svai', version = 0, 0){
    unsigned int(1) duplication_flag;
    unsigned int(7) reserved;
}
[Semantics]
duplication_flag: it indicates whether stereoscopic video-related information contained in each 'svmi'
Box of associated stereoscopic contents is the same. (0: duplication false, 1:duplication true)

Figure 8:
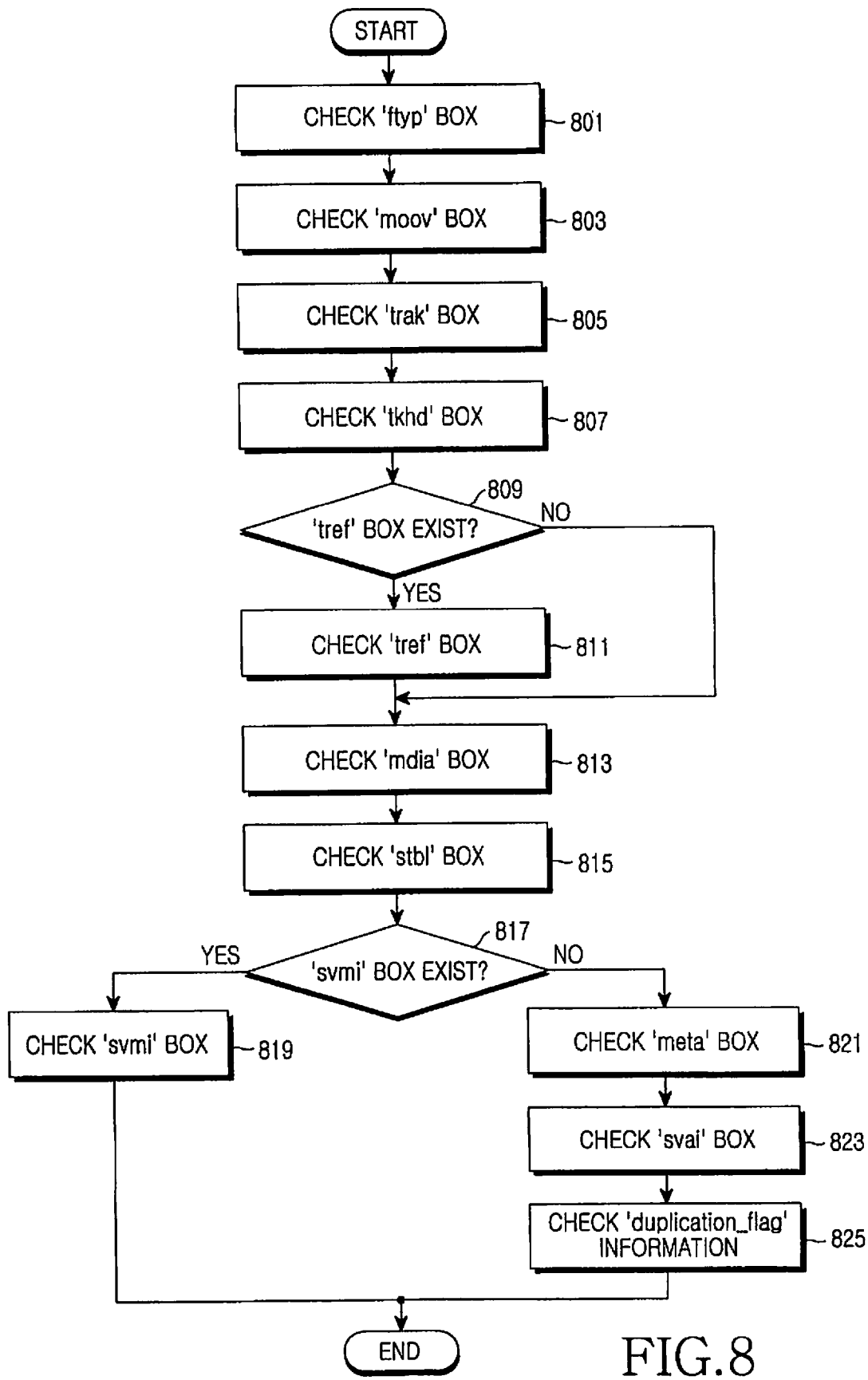
FIG. 8 illustrates a terminal operation of parsing a media file according to the fifth embodiment of the present invention.

FIG. 8 illustrates a terminal operation of parsing a media file according to the third embodiment of the present invention.

Referring to FIG. 8, a terminal checks an 'ftyp' box in a media file in step 801. The terminal checks a 'moov' box in step 803, and checks a 'trak' box in step 805. The sub-process of checking the 'trak' box is repeatedly implemented on the first track to the last track of the media file. In step 807, the terminal checks a 'tkhd' box to identify track_ID. Thereafter, in step 809, the terminal determines whether the track includes a 'tref' box. If the track includes a 'tref' box, the terminal checks the 'tref' box in step 811. Thereafter, the terminal checks an 'mdia' box in step 813.

If the track does not include a 'tref' box in step 809, the terminal bypasses step 811 and directly proceeds to step 813 where it checks an 'mdia' box of the track, and then checks an 'stbl' box in step 815. In step 817, the terminal determines whether an 'svmi' box with stereoscopic video-related information exists in the 'stbl' box. If the 'svmi' box exists, the terminal checks the 'svmi' box in step 819. However, if the 'svmi' box does not exist, the terminal checks a 'meta' box in step 821, checks a 'svai' box, which is a 'meta' box at a 'trak' level including information about each track, in step 823, and checks 'duplication_flag' information in the 'svai' box in step 825.

Although a process of checking the respective boxes is needed in all operations of the terminal, the sequence in which the respective boxes are checked does not have to follow the sequence in the drawing. The parsing process for the file format and the terminal's operation, which are not described in detail herein, will conform to the ISO/IEC 14496-12 standard.

Figure 9:
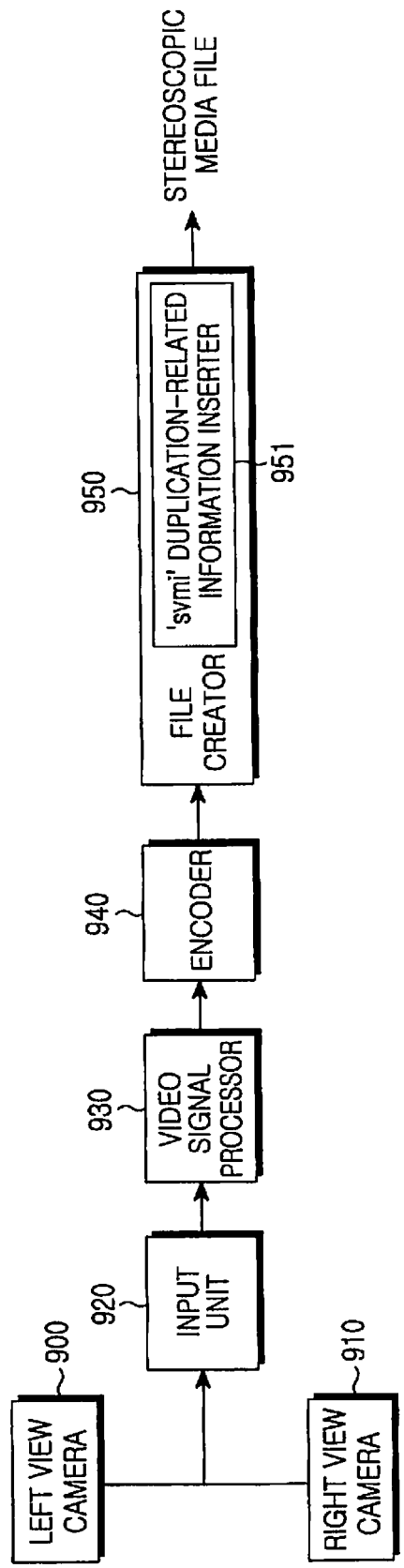
FIG. 9 illustrates a media file creation apparatus according to the present invention.
Figure 10:
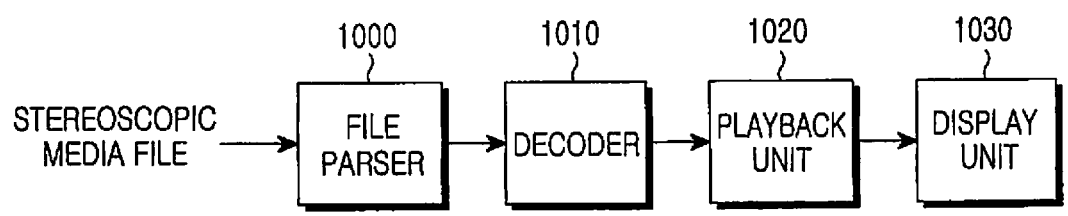
FIG. 10 illustrates a media file playback apparatus according to the present invention.

FIG. 9 illustrates a media file creation apparatus according to the present invention, and FIG. 10 illustrates a media file playback apparatus according to the present invention.

Referring to FIG. 9, a media file creation apparatus includes a left view camera 900, a right view camera 910, an input unit 920, a video signal processor 930, an encoder 940, and a file creator 950 that includes creating an 'svmi' box and information indicating duplication of 'svmi' information.

The information indicating duplication of 'svmi' information is represented in the method described in the preferred embodiments of the present invention. Images photographed by the left view camera 900 and the right view camera 910 are input to the video signal processor 930 via the input unit 920. The left/right view image data undergoes preprocessing in the video signal processor 930. The preprocessing process includes converting analog external image values into digital values, and composing a left view sequence and a right view sequence. The preprocessed image is encoded by the encoder 940.

The file creator 950 creates a media file using the image data encoded by the encoder 940. Here, the image data is stored in a media data ('mdat') area, and a type of a media file and information for replaying the media file are stored in a file type ('ftyp') area and a movie ('moov') area, respectively. The created stereoscopic media file is input or transferred to a stereoscopic media file playback apparatus, which replays and displays the image. The file creator 950 includes an 'svmi' duplication-related information inserter 951. The 'svmi' duplication-related information inserter 951 inserts 'svmi' duplication-related information in the media file according to the present invention.

Referring to FIG. 10, a media file playback apparatus includes a file parser 1000, a decoder 1010, a playback unit 1020, and a display unit 1030.

The file parser 1000 parses the media file created by the file creator 950 in the media file creation apparatus and the information stored in the 'ftyp' area and the 'moov' area, and the decoder 1010 decodes the image data stored in the 'mdat' area using the parsed information. The playback unit 1020 replays the decoded data, and the display unit 1030 displays the data replayed by the playback unit 1020 on a display device of the terminal.

Operations of the system for creating and replaying the stereoscopic media file are subject to change according to apparatuses.

Although not specifically described in the present invention, the basic operation performed on the file format will follow details of the ISO/IEC 14496-12 standard. In addition, as the file format suggested by the present invention may be compatible with file formats extended from the ISO Base Media File format or the ISO Base Media File format, the stored media data can be transferred or applied to various multimedia applications.

As is apparent from the foregoing description, when stereoscopic video-related information of each track is the same regarding the stereoscopic contents consisting of two or more tracks, the present invention efficiently indicates that the tracks use the same stereoscopic video-related information.

In addition, the present invention avoids storing the same information in a duplicated manner.

Furthermore, the present invention prevents the same information from being duplicated, thereby reducing the file size and terminal's overhead.

Preferred embodiments of the present invention are also embodied as computer-readable codes on a computer-readable recording medium. The computer-readable recording medium is any data storage device that can store data, which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium is also distributable over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for parsing stereoscopic content in a media file, the method comprising:
   receiving, by a receiver, the stereoscopic content; and
   parsing, by a processor, a track reference field and a duplication indication field and using stereoscopic view-related information with at least one of a plurality of tracks and at least one other track,
   wherein the stereoscopic content includes:
   a plurality of tracks for storing video data,
   the stereoscopic video-related information for providing three-dimensional video on a terminal, the stereoscopic video-related information included in at least one of the plurality tracks,
   the track reference field including information used to connect the at least one of the plurality of tracks to the at least one other track in the media file to which the at least one track refers, and
   the duplication indication field for indicating that stereoscopic video related information comprised in at least one of the plurality of tracks is to be associated with the at least one other track connected to the at least one of the plurality of tracks by the track reference field, and
   wherein the duplication indication field is omitted in any one of the at least one of the plurality of tracks and the at least one other track, if the stereoscopic video-related information between the at least one of the plurality of tracks and the at least one other track is the same.

2. The method of claim 1, wherein the duplication indication field is situated in a stereoscopic video media information ('svmi') box including the stereoscopic video-related information.

3. The method of claim 2, wherein the 'svmi' box is situated in a sample table ('stbl') box containing information on a sample of a media file in a track area.

4. The method of claim 1, wherein the duplication indication field is situated in a stereoscopic video additional information ('svai') box.

5. The method of claim 4, wherein the 'svai' box comprises information indicating a track from which an 'svmi' box with the stereoscopic video-related information is omitted.

6. The method of claim 5, wherein the 'svai' box is defined in a box at a movie ('moov') level included in a 'moov' box.

7. The method of claim 5, wherein the 'svai' box is defined in a meta ('meta') box at a 'moov' level.

8. The method of claim 5, wherein the 'svai' box comprises a stereo_contents_count field indicating a number of stereoscopic content pairs when there are multiple stereoscopic content pairs, a duplication indication field indicating duplication of stereoscopic view sequences associated with each content, and information on a track with an omitted 'svmi' box in each pair.

9. The method of claim 8, wherein the 'svai' box comprises a stereo_contents_count field indicating a number of stereoscopic content pairs when there are multiple stereoscopic content pairs, duplication_count information indicating a number of duplicated 'svmi' boxes, a duplication indication field indicating duplication of stereoscopic view sequences associated with each content, and information on a track with an omitted 'svmi' box in each pair.

10. The method of claim 1, wherein the duplication indication field is added in an 'svai' box in a track with an omitted 'svmi' box.

11. A terminal apparatus for parsing stereoscopic content in a media file, the apparatus comprising:
   a receiver for receiving stereoscopic content; and
   a processor for parsing a track reference field and a duplication indication field and using stereoscopic view-related information with at least one of a plurality of tracks and at least one other track,
   wherein the content includes:
   the plurality of tracks for storing video data,
   the stereoscopic video-related information for providing three-dimensional video on the terminal, the stereoscopic video-related information included in the at least one track,
   the track reference field including information used to connect the at least one of the plurality of tracks to the at least one other track in the media file to which the at least one track refers, and
   the duplication indication field for indicating that the stereoscopic video related information comprised in the at least one of the plurality of tracks is to be associated with the at least one other track connected to the at least one of the plurality of tracks by the track reference field, and
   wherein the duplication indication field is omitted in any one of the plurality of tracks and the at least one other track, if the stereoscopic video-related information between the at least one of the plurality of tracks and the at least one other track is the same.

12. The apparatus of claim 11, wherein the duplication indication field is situated in a stereoscopic video media information ('svmi') box including the stereoscopic video-related information.

13. The apparatus of claim 12, wherein the 'svmi' box is situated in a sample table ('stbl') box containing information on a sample of a media file in a track area.

14. The apparatus of claim 11, wherein the duplication indication field is situated in a stereoscopic video additional information ('svai') box.

15. The apparatus of claim 14, wherein the 'svai' box comprises information indicating a track from which an 'svmi' box with the stereoscopic video-related information is omitted.

16. The apparatus of claim 15, wherein the 'svai' box is defined in a box at a movie ('moov') level included in a 'moov' box.

17. The apparatus of claim 15, wherein the 'svai' box is defined in a meta ('meta') box at a 'moov' level.

18. The apparatus of claim 15, wherein the 'svai' box comprises a stereo_contents_count field indicating a number of stereoscopic content pairs when there are multiple stereoscopic content pairs, a duplication indication field indicating duplication of stereoscopic view sequences associated with each content, and information on a track with an omitted 'svmi' box in each pair.

19. The apparatus of claim 18, wherein the 'svai' box comprises a stereo_contents_count field indicating a number of stereoscopic content pairs when there are multiple stereoscopic content pairs, duplication_count information indicating a number of duplicated 'svmi' boxes, a duplication indication field indicating duplication of stereoscopic view sequences associated with each content, and information on a track with an omitted 'svmi' box in each pair.

20. The apparatus of claim 11, wherein the duplication indication field is added in an 'svai' box in a track with an omitted 'svmi' box.

21. A non-transitory computer-readable recording medium for storing software, which when executed controls a processor to perform a method for parsing stereoscopic content in a media file, the method comprising:
receiving the stereoscopic content; and
parsing a track reference field and a duplication indication field and using stereoscopic view-related information with at least one of a plurality of tracks and at least one other track,
wherein the stereoscopic content includes:
a plurality of tracks for storing video data,
the stereoscopic video-related information for providing three-dimensional video on a terminal, the stereoscopic video-related information included in at least one of the plurality tracks,
the track reference field including information used to connect the at least one of the plurality of tracks to the at least one other track in the media file to which the at least one track refers, and
the duplication indication field for indicating that stereoscopic video related information comprised in at least one of the plurality of tracks is to be associated with the at least one other track connected to the at least one of the plurality of tracks by the track reference field, and
wherein the duplication indication field is omitted in any one of at least one of the plurality of tracks and the at least one other track, if the stereoscopic video-related information between the at least one of the plurality of tracks and the at least one other track is the same.

22. The computer-readable recording medium of claim 21, wherein the duplication indication field is situated in a stereoscopic video media information ('svmi') box including the stereoscopic video-related information.

23. The computer-readable recording medium of claim 22, wherein the 'svmi' box is situated in a sample table ('stbl') box containing information on a sample of a media file in a track area.

24. The computer-readable recording medium of claim 21, wherein the duplication indication field is situated in a stereoscopic video additional information ('svai') box.

25. The computer-readable recording medium of claim 24, wherein the 'svai' box comprises information indicating a track from which an 'svmi' box with the stereoscopic video-related information is omitted.

26. The computer-readable recording medium of claim 25, wherein the 'svai' box is defined in a box at a movie ('moov') level included in a 'moov' box.

27. The computer-readable recording medium of claim 25, wherein the 'svai' box is defined in a meta ('meta') box at a 'moov' level.

28. The computer-readable recording medium of claim 25, wherein the 'svai' box comprises a stereo_contents_count field indicating a number of stereoscopic content pairs when there are multiple stereoscopic content pairs, a duplication indication field indicating duplication of stereoscopic view sequences associated with each content, and information on a track with an omitted 'svmi' box in each pair.

29. The computer-readable recording medium of claim 28, wherein the 'svai' box comprises a stereo_contents_count field indicating a number of stereoscopic content pairs when there are multiple stereoscopic content pairs, duplication__count information indicating a number of duplicated 'svmi' boxes, a duplication indication field indicating duplication of stereoscopic view sequences associated with each content, and information on a track with an omitted 'svmi' box in each pair.

30. The computer-readable recording medium of claim 21, wherein the duplication indication field is added in an 'svai' box in a track with an omitted 'svmi' box.

\* \* \* \* \*